Figure 3:
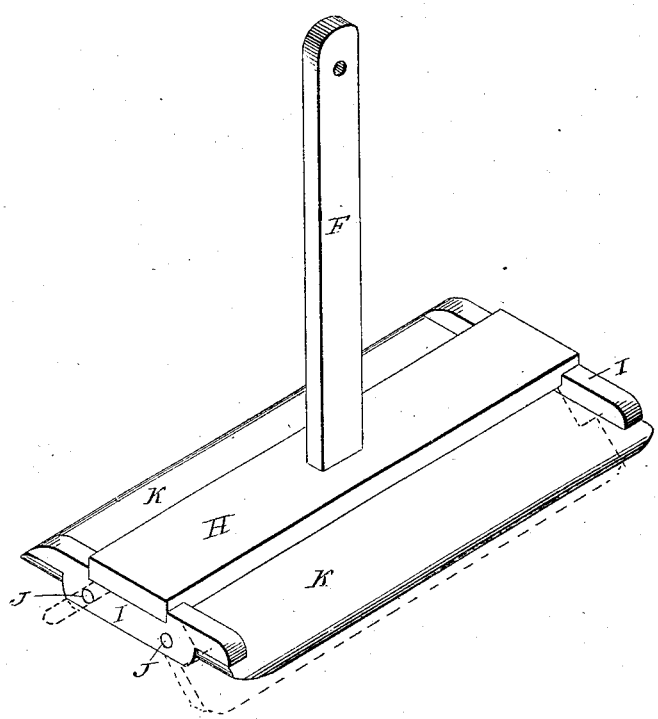

(No Model.) 2 Sheets—Sheet 1.
C. BERST.
CHURN.
No. 315,227. Patented Apr. 7, 1885.
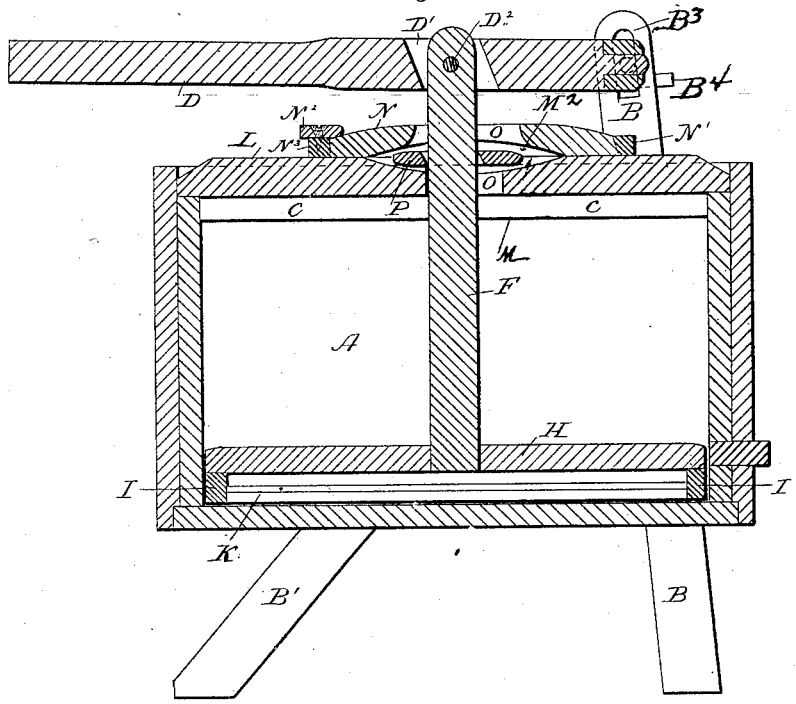
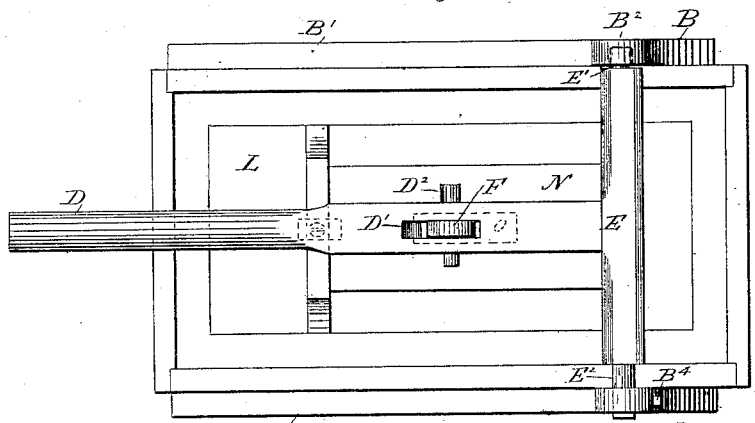
Witnesses:
E. F. Murdock
D. M. Oliver
Inventor:
Conrad Berst
by H. A. West
atty.

(No Model.) 2 Sheets—Sheet 2.
C. BERST.
CHURN.

No. 315,227. Patented Apr. 7, 1885.

Witnesses:
E. T. Murdock
D. M. Oliver

Inventor:
Conrod Berst
by H. Alvord
atty.

UNITED STATES PATENT OFFICE.

CONRAD BERST, OF ORRVILLE, OHIO.

CHURN.

SPECIFICATION forming part of Letters Patent No. 315,227, dated April 7, 1885.

Application filed June 16, 1884. (No model.)

*To all whom it may concern:*

Be it known that I, CONRAD BERST, of Orrville, county of Wayne, and State of Ohio, have invented a new and useful Improvement in Churns; and I do hereby declare that the following is a full, clear, and exact description of the invention, which will enable others skilled in the art to which it appertains to make and use it, reference being had to the accompanying drawings, forming a part thereof.

My invention relates to improvements in churns in which a dasher is operated by a lever-handle, the same being swung on the frame-work of the churn-barrel.

The objects of the invention are to churn the cream in the most convenient manner for the operator; to churn thoroughly and rapidly; to prevent the customary splashing through the aperture in the top of churn, to receive the plunger, and to provide a chamber for the introduction of air into the churn. I accomplish these objects in the manner and by the mechanism shown in the drawings, in which—

Figure 1 is a side sectional view. Fig. 2 is a plan view. Fig. 3 is a detail of dasher.

Supported upon the standards or legs B B' is the box A. This box is made of wood or metal, and joined at the corners, as shown in drawings, the end pieces being cut to receive and overlap the side pieces. Near the top of the side pieces are the strips C C, these serving to keep the dasher from striking against and lifting the cover of box, and also, in conjunction with the shoulders on the end pieces, forming a rest for said cover.

The supports B are fastened to the sides of the box A by any device, and raked slightly toward the rear end. They are provided with the holes $B^2$ and $B^3$, which form the bearings for the rock-shaft of the lever. Fitted close to them, and and also fastened to the box, are the braces B'. These extend down beyond the box and form the legs, as shown.

$B^2$ is a hole cut in one of the supports B, and $B^3$ is a slot cut in the other support, these both forming the bearings for the rock-shaft before spoken of. The slot $B^3$ is elongated in shape, for the purpose hereinafter to be described. The pin $B^4$ is fitted into the holes punctured in either side of slot $B^3$. This pin is passed under the end of shaft to a level.

The pin $B^4$, inserted through openings in the upright B across the slot $B^3$, is used for elevating or lowering that end of shaft E by being placed in a higher or lower hole, of which a series are formed in the part B.

The lever-handle D is provided near its middle with the slot D', in which is swung the plunger-rod by means of the pin $D^2$. The end of the lever-handle is attached to the rock-shaft E. This shaft has on either end a bearing, E' and $E^2$, the latter of which is rather longer than the former, and fits in the slot $B^3$, where it is supported by pin $B^4$. It is by means of this that the shaft E is extricated from the supports B B.

To the end of the plunger F is attached the dasher. This dasher is composed of the break-board H, to which the plunger is attached; the end bars, I I, providing bearings for the pivot-points J J, and fastened fixedly to the break-board H; and the vibrating blades K K, having the pivot-points J J, as before stated, near their tops. All these parts work in unison, as will be more full stated in the operation.

The cover L is scooped out in the center, forming the slot M. Directly over said slot fits the lid N. This lid has its under face gouged out to correspond with the slot M, forming together the air-chamber $M^2$. The lid N is fastened and held down by means of the under beveled strip, N', and the button $N^2$, attached to strip $N^3$. Cut in the covers N and L are the slots O O, through which the plunger passes. Inside of the air-chamber $M^2$ is the washer P. This is a small piece of wood provided with a slot, through which the plunger F passes, the washer fitting close to said plunger and preventing any splash coming through the slots O O.

Now having described the parts of my invention, I will proceed to describe the operation.

I think, after saying that the lever D and rock-shaft E are common and manipulated in the ordinary way, that the only thing that remains is the action of the dasher and the air-chamber. As the lever-handle is raised the dasher is also raised, and the paddle-blades K fall at their outer ends, because of weight or resistance of the cream, and the cream is forced over against the sides of the box A. The motion is then reversed, and the blades are spread out so as to nearly reach the sides, and the cream is forced between the blades; then striking the break-board H, it is again disturbed and turned out of its course. By this double motion the cream is thoroughly agitated. At every plunge or lift of the dasher the air-chamber supplies air to the churn, or allows the air to pass off, the washer preventing the splash from escaping and coming out of the slot in the lid to air-chamber.

Having thus described the invention, I claim—

1. The combination, with the dasher H and plunger F, and operating means, as described, of the lid L, hollowed out and slotted in the center, as shown and described, the supplemental lid N, secured upon lid L and concaved underneath, and slotted, as described; so that the parts N and L form the space $M^2$, and the washer P, placed upon the plunger F and lying between the lids N and L in the space $M^2$, as and for the purpose set forth.

2. The combination, with the dasher, plunger-arm, and operating means, of the lid L, having the undercut cleat $N'$ on one side, the plane cleat $N^3$ on the other, the secondary lid N, let under cleat $N'$, and held by the overlapping button $N^2$, the lids L and N being so shaped as to form a space, $M^2$, between them, and the washer P, set over the part F and lying in the space $M^2$, as set forth.

In testimony that I claim the foregoing I append my signature.

CONRAD BERST.

Witnesses:
 KILIAN DOPP,
 WILLIAM GILLAND.